United States Patent Office 3,566,506
Patented Mar. 2, 1971

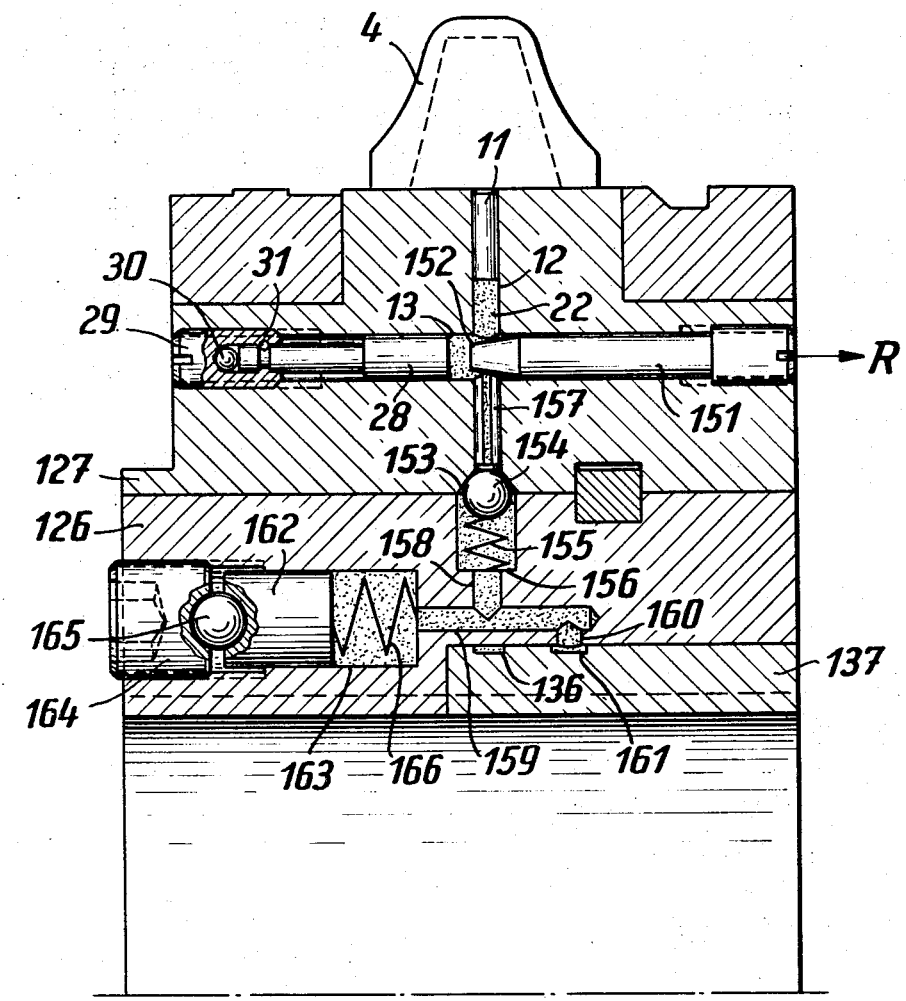

3,566,506
CUTTER-EQUIPPED MILLING TOOL AND DEVICE FOR ADJUSTING AND TENSIONING THE CUTTERS OF MILLING TOOLS
Adolf Wolf, Jes-Juhl-Weg 9, Hamburg 52, Germany
Filed Jan. 24, 1968, Ser. No. 700,109
Int. Cl. B23p 19/00; B26d 1/12
U.S. Cl. 29—200
11 Claims

ABSTRACT OF THE DISCLOSURE

A system for manufacturing and assembling milling tools wherein the tool includes a base member having a plurality of individual cutting elements mounted thereon. The cutting elements are both radially adjusted, and clamped to the base member by hydraulic fluid pressure devices, and, during assembling of the cutters to the base member, a centering ring is mounted upon the base member in a concentric manner wherein the radial adjustment of the cutters is determined by engagement with the centering ring. In an embodiment of the invention communication exists between each of the radially adjusting and clamping elements, respectively, whereby simultaneous operation thereof may be produced.

Figure 1:
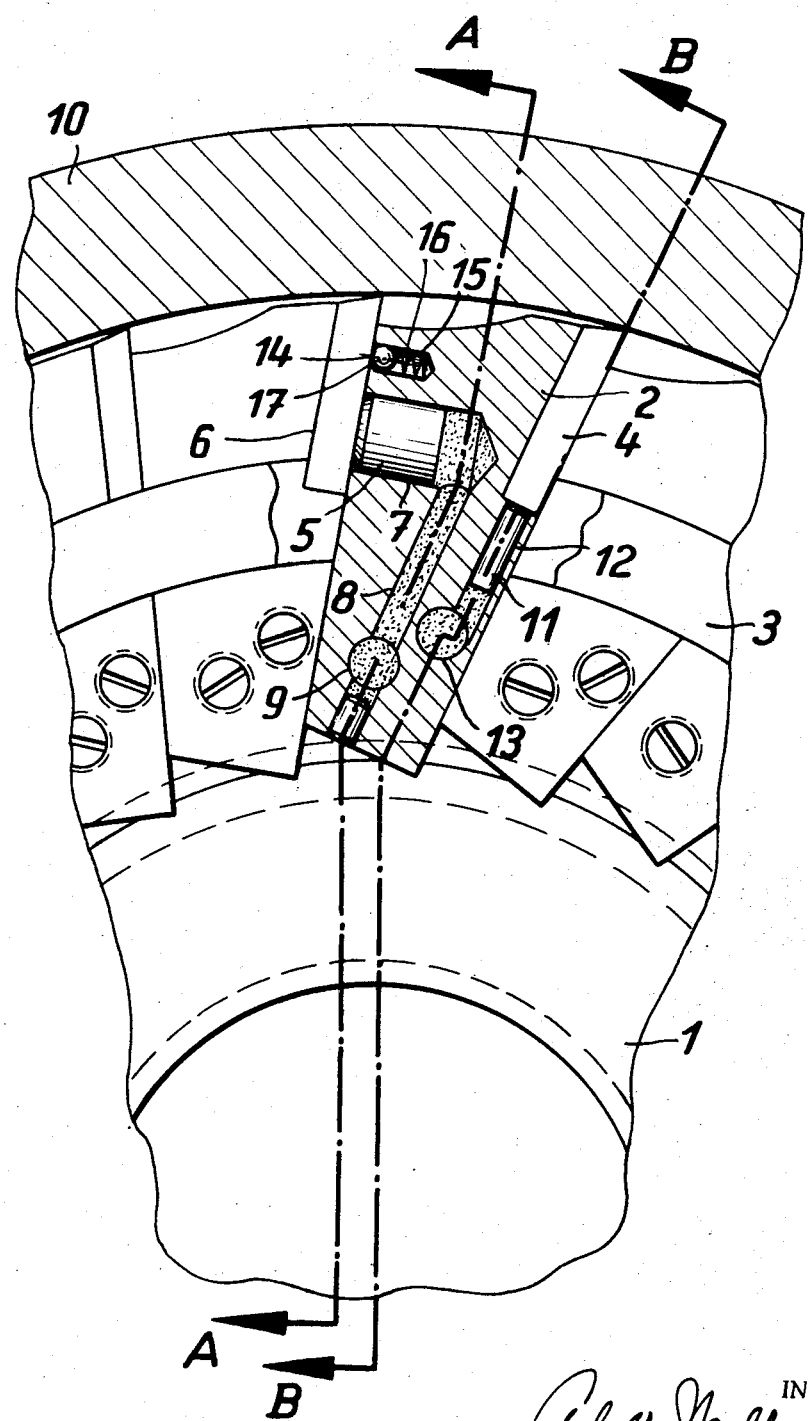

In order to obtain a correspondingly high accuracy in a milling tool, in dependence upon the high quality of the product to be obtained, especially with respect to rotation, pitch, and plane movement, and at the same time to obtain a simplified construction of the milling tool certain requirements must be met. For instance, such tools call for a cutter equipment which, on the one hand, makes possible a centering surface shaped for the individual cutters and the adjustment thereof in this centered position largely notwithstanding any tolerances of the cutter heads and the cutters, and, on the other hand, fastens the fixed cutters individually, quickly and non-displaceably. Thus, there must be secured both an accurate adjustability and a quick clamping of each individual cutter in the milling tool, so that the advantage of the high surface quality desired is maintained, and the disadvantage of high expenses in time and costs of the known constructions of cutter heads is avoided.

For performing an end face milling operation, two constructions are known which differ in the essential features thereof. Cutter heads for milling plane surfaces are used which are equipped either with bonded cutting members or with clamped reversing cutter discs made, for example, of a cutting material hard metal.

For the employment of cutter heads with bonded cutting members, in addition to a bonding device, a costly cutter head grinding machine is also necessary. This technique meets the very high surface quality requirements of face milling of, for example, oil or vapour tight surfaces, but requires correspondingly high costs of operation. When using cutter heads with reversible cutter discs, the employment of cutter head grinding machines is dispensed with which also eliminates the high proportion of grinding machine costs, and the costs of operation are correspondingly reduced. But to obtain the same plane running accuracy of the tool as is possible with a machine-ground cutter head, in spite of exercising utmost care when inserting the reversible cutter discs, an additional special measure must still be performed. It is known, for example, that an additional dressing apparatus for fine-grinding the cutting edges is employed on the milling machine proper. With this, the manufacturing tolerances of the cutter head and the reversible cutter discs which are too high for face milling, are corrected to the plane running accuracy necessary for face milling such that the proportion of the costs of operation caused by grinding is considerably reduced as compared with the costs of a cutter head grinding machine, but cannot be completely eliminated.

The known constructions of cutter heads for end face milling which differ from each other by bonded cutters on the one hand and clamped cutter discs on the other hand are also used for milling with cylindrical cutters, profiling and tooth shape milling as well as for hob-type milling. Another essential distinguishing feature results from the method of sharp grinding the cutter heads. On the one hand, it is the milling tools that are sharp-ground in the finally assembled condition on a special grinding machine, for example, a cutter head grinding machine or a hob-type milling cutter grinding machine and, on the other hand, it is the cutter heads with cutters adjustable according to a gauge, that are re-ground outside the cutting body. It is known that high surface qualities may be obtained with machine-ground cutter heads due to their favourable running properties, and it is furthermore known that correspondingly high operational costs exist with such milling tools conditioned by the grinding machine. Contrary to this, the cutter heads with cutters adjustable according to a gauge can be produced at low costs, but also cause inferior surface qualities due to the less favourable running properties.

The known gauge adjusting methods which are employed with this construction of cutter heads however, are always subjected to inevitable influences from the operator in spite of utmost care, which in turn influences the running accuracy of the cutting tools.

The invention is based on the problem of providing a milling tool in which the centering, adjustment and fastening of the individually inserted cutters is essentially simplified and which essentially reduces the time and costs usually necessary therefor, without negatively influencing the degree of the quality of the tool necessary for such operations and calling for a high degree of accuracy. This inventive problem also includes that the cutter which has become blunt in operation needs to be re-ground only in correspondence with its wear bevel. In this connection, for reasons of simplification, it is to be unnecessary to pay consideration to the uniformity of the individual cutters relative to each other related to their dimensions by length, width and thickness. Only the shapes of the cutting edges must be in conformity with each other.

The problem is solved in accordance with the invention in that the individually inserted cutters of the milling tool are centered, adjusted and tensioned in a three-phase sequence, namely the cutters are first exactly centered in their position with respect to their cutting edges by a parted ring, the inner configuration of which corresponds to the outer configuration of the generating tool; secondly, the cutters are adjusted to the inner surface of the centering ring by hydraulically operated slides in the form of plungers, and third, the cutters are non-displaceably fastened in the cutting tool by hydraulically operated clamping elements.

In order to be able to re-grind such a tool with cutters that have become blunt in operation, in a simple manner by semi-skilled personnel, in accordance with another development of the invention, the cutters of the milling tool are ground to shape only at the free surface thereof, namely, only in correspondence with the wear bevel of the individual cutter without having to pay any consideration to a uniformity of the cutters with respect to each other.

In order to provide, on the other hand, a milling tool for metal working with the greatest possible number of cutters, in accordance with the invention, a plurality of segmental pieces disposed in contact with each other are arranged on a body member adapted to be driven to perform a rotary movement. Segmental pieces are fastened on the body member with the aid of at least one ring, preferably two axially spaced rings and on an essentially radially extending surface of the segmental piece there is arranged a recess designated a cutter accommodating recess to accommodate a cutter, which is adjustable in parallel with said radial surface by means of an adjusting device to be actuated from outside and arranged in the segmental piece. Finally, to solve the problem of the invention, there is arranged in the segmental member a tensioning device capable of being externally actuated, said clamping device tensioning the cutter of the adjacent segmental piece by exertion of a force effective vertically on the radial surface. Preferably, in this arrangement, both the adjusting device and the tensioning device are hydraulically operated. When using the above mentioned centering ring, all the devices for hydraulic operation of the adjusting and tensioning devices may be operated from at least one of the two radial limiting surfaces of the milling tool.

With profile millers, gang cutters and hob-type milling cutters, this side-by-side arrangement of the individual segmental pieces is of decisive importance to obtain the greatest possible number of cutters in order to obtain at the workpiece the highest possible surface quality with economically acceptable manufacturing costs. With milling heads i.e. end face millers, it is possible under certain circumstances to dispense with side-by-side arrangement of the individual segmental pieces, because here the periphery of the milling head may be selected to be of such a size that a sufficient number of cutters may be accommodated on the periphery. In this case, however, the hydraulic adjustment and tight clamping of the individual cutters with the aid of the centering ring of the invention as described is of decisive importance for a favourable operating procedure.

In general, the centering ring must be a multiple ring and, in particular, bipartite, it being recommended to have the severing plane between the two parts of the centering ring pass through the axis of the milling tool. The centering ring of an end mill cutter head could also be formed in one piece although the bipartite embodiment is recommended.

Suitably, both halves of the centering ring are exactly guided in a special adjusting stand for mutual axial movement. After in the extended condition of the halves of the centering ring the respective milling tool has been inserted with all the cutters in place, the halves of the centering ring are moved together and therewith the ring is closed. Now, at first, the adjusting device and thereafter the tensioning device are hydraulically biased. The actuation of these hydraulically adjusting and tensioning devices must be effected from the radial limiting surfaces of the milling tool in order to be able to make the periphery of the centering ring sufficiently tight. After the cutters have been hydraulically tensioned in the hydraulically adjusted position, the centering ring halves may be moved away from each other and the milling tool ready for operation may be removed from the centering ring.

The replacement of the cutters in the milling tool which are individually inserted and exactly fixed in their position, necessitates as many adjusting and clamping procedures as there are blanks or holders available on the periphery of the milling tool. In order to reduce this plurality of tensioning and adjusting processes to be carried out individually down to one process each, in accordance with another development of the invention, the hydraulically operated adjusting and tensioning elements of the individual planks or holders for the inserted cutters of the milling tool are interconnected relative to amongst each other each by a conduit so that the adjustment as well as the tensioning and relaxation, respectively, can be performed centrally by only one controlling process.

Apart from this simplification by centrally controlling the replacement of the cutters in the milling tool, for example, it is, however, also advantageous if individually operated tensioning processes can be carried out simultaneously on one and the same milling tool, as is suitable, for example when inserting the cutters into the accommodating recesses of the milling tool not secured by springs. In order to prevent the just inserted cutters from falling out of the recesses of the milling tool when carrying out the hydraulic bias which has to be performed individually, in accordance with another embodiment of the invention, the hydraulic connections of the central control system of the adjusting and tensioning elements, respectively, of the individual holders of the milling tool are switched on or off by cut-off elements in the manner as required by the respective type of tool just being employed and the most suitable run-off of operations to which the milling tool is programmed. It is possible with this universal control system for adjusting and tensioning the cutters to perform in practice all the cases of application of the manufacturing operation in a universal manner.

For explanation of the invention, examples of embodiments are shown in the following drawings.

Figure 2:
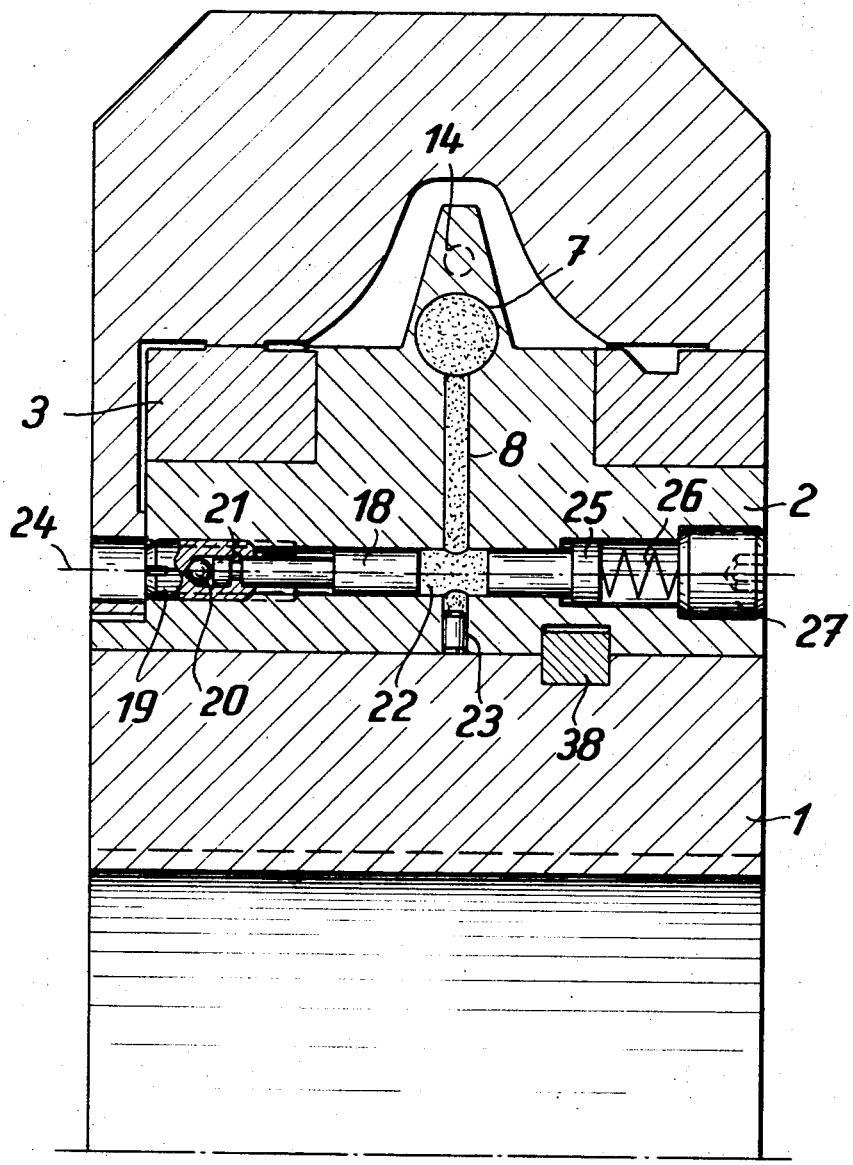
Figure 3:
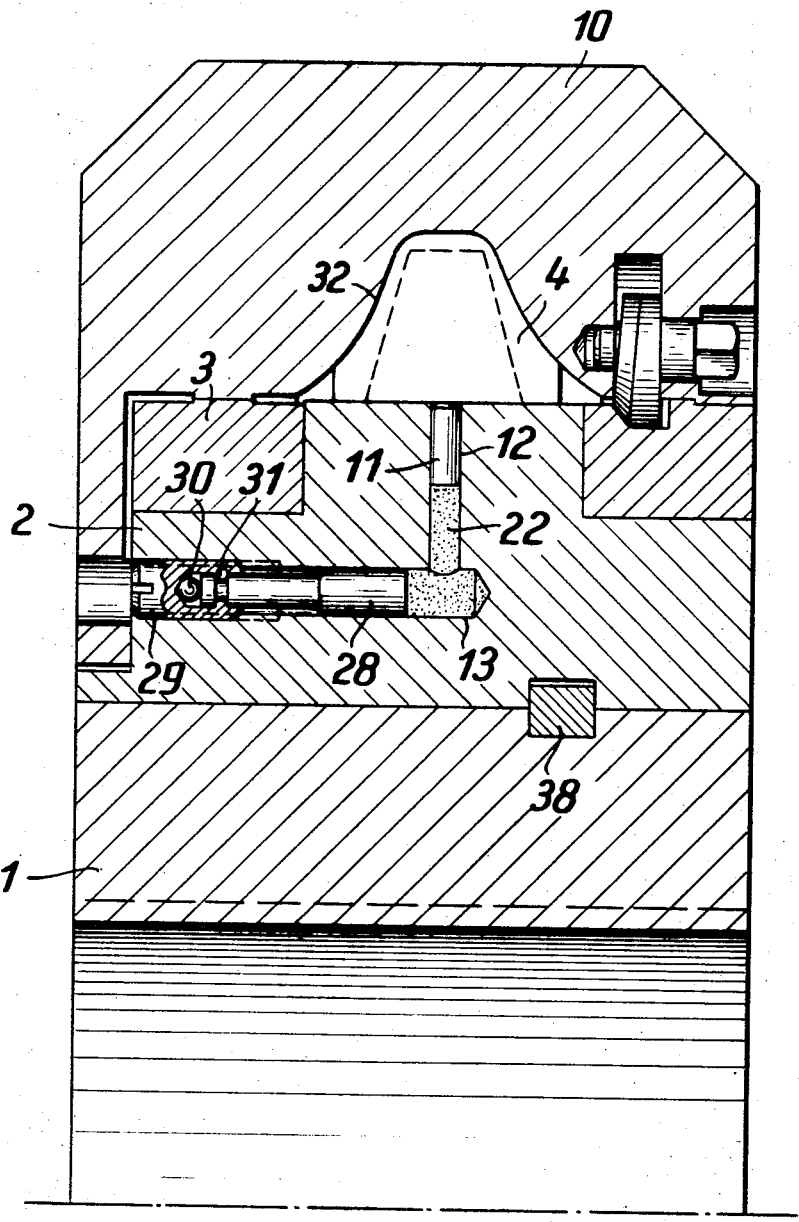
Figure 4:
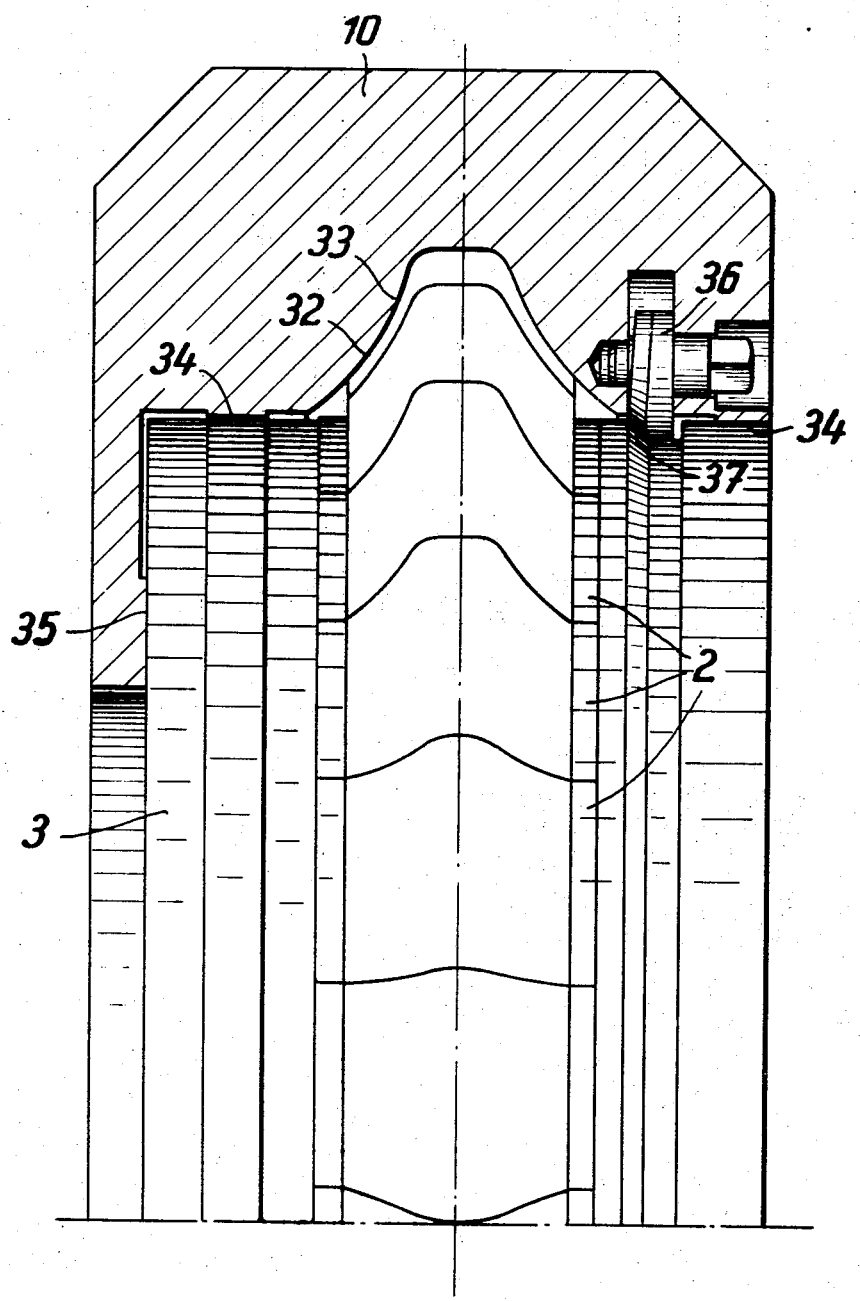
Figure 5:
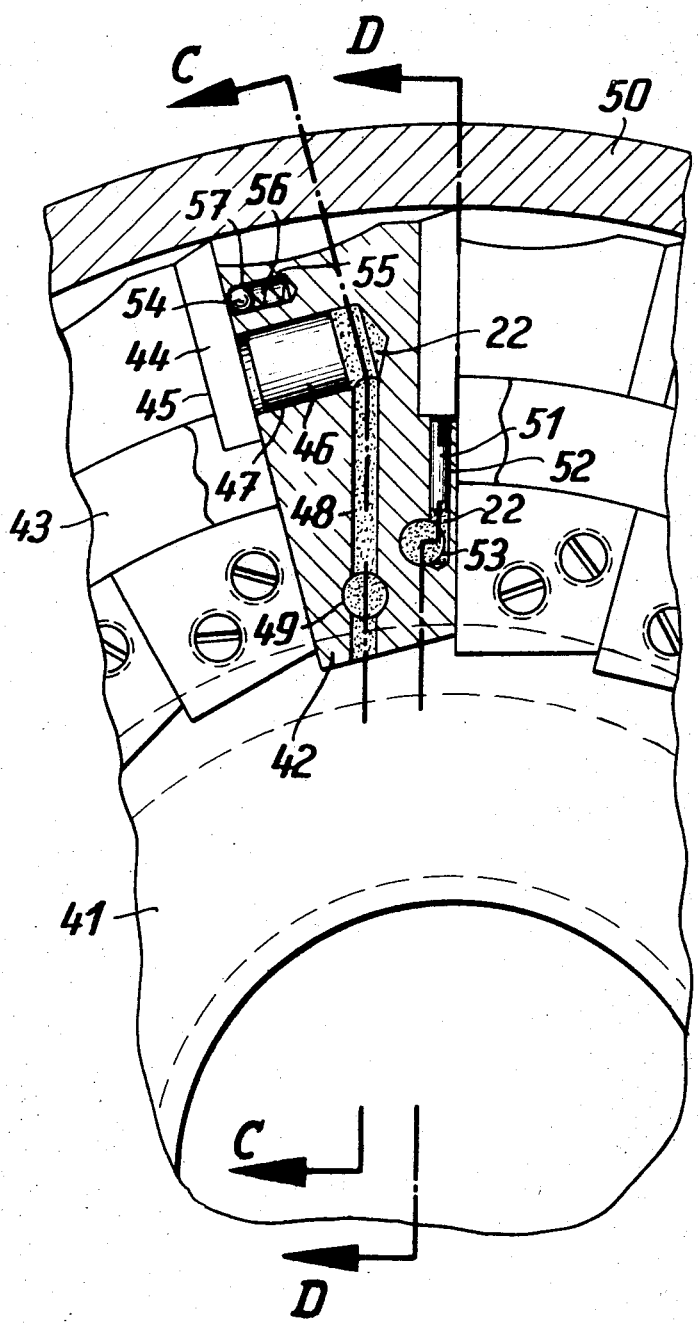
Figure 6:
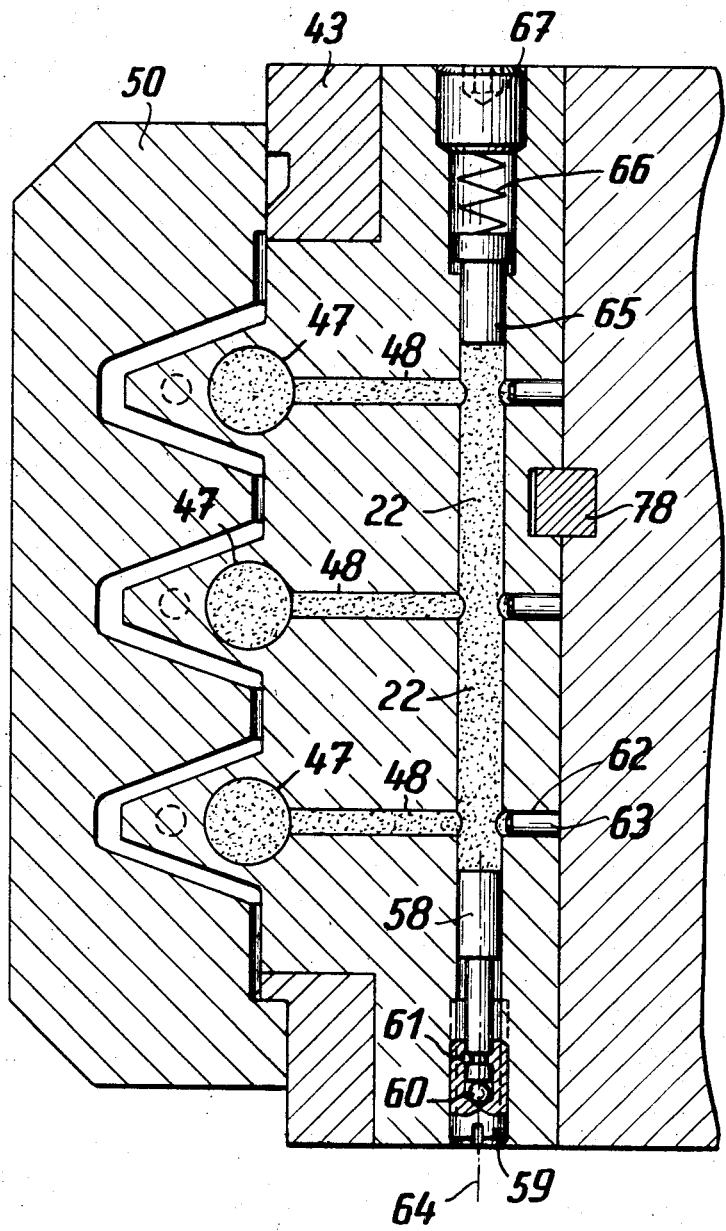
Figure 7:
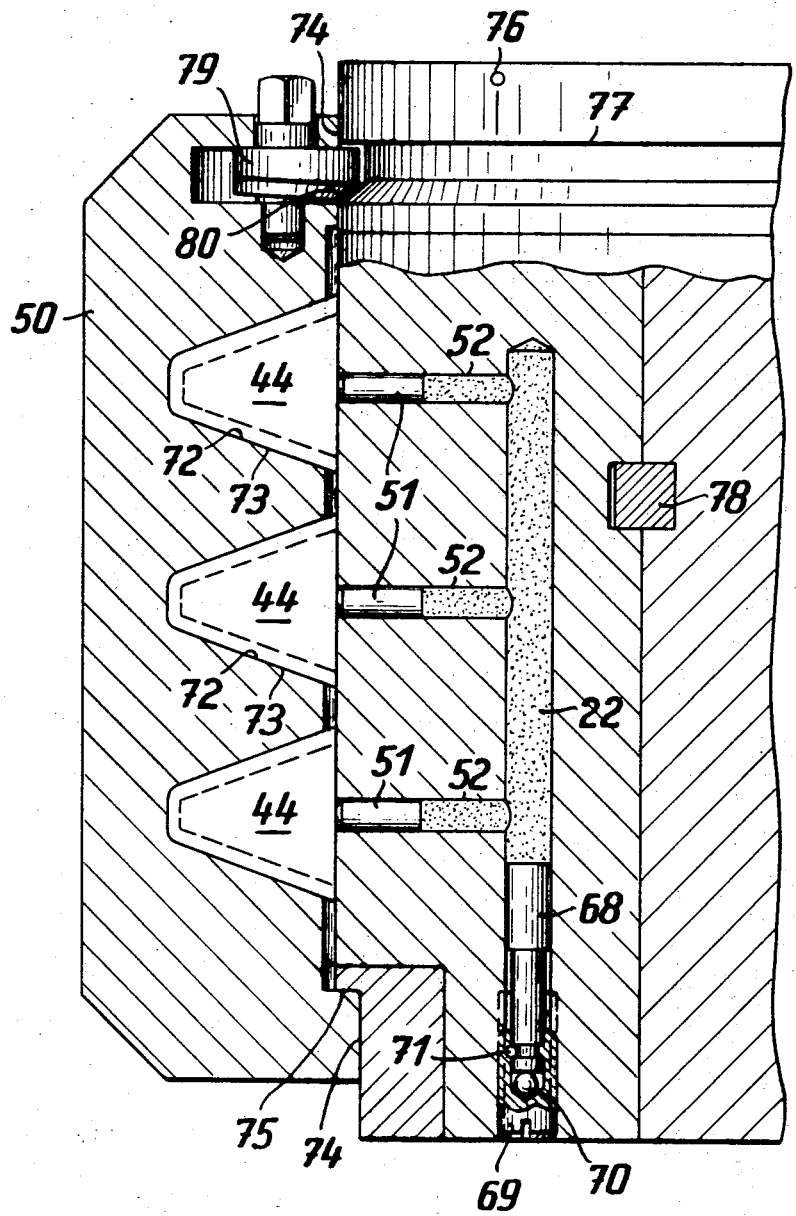
Figure 8:
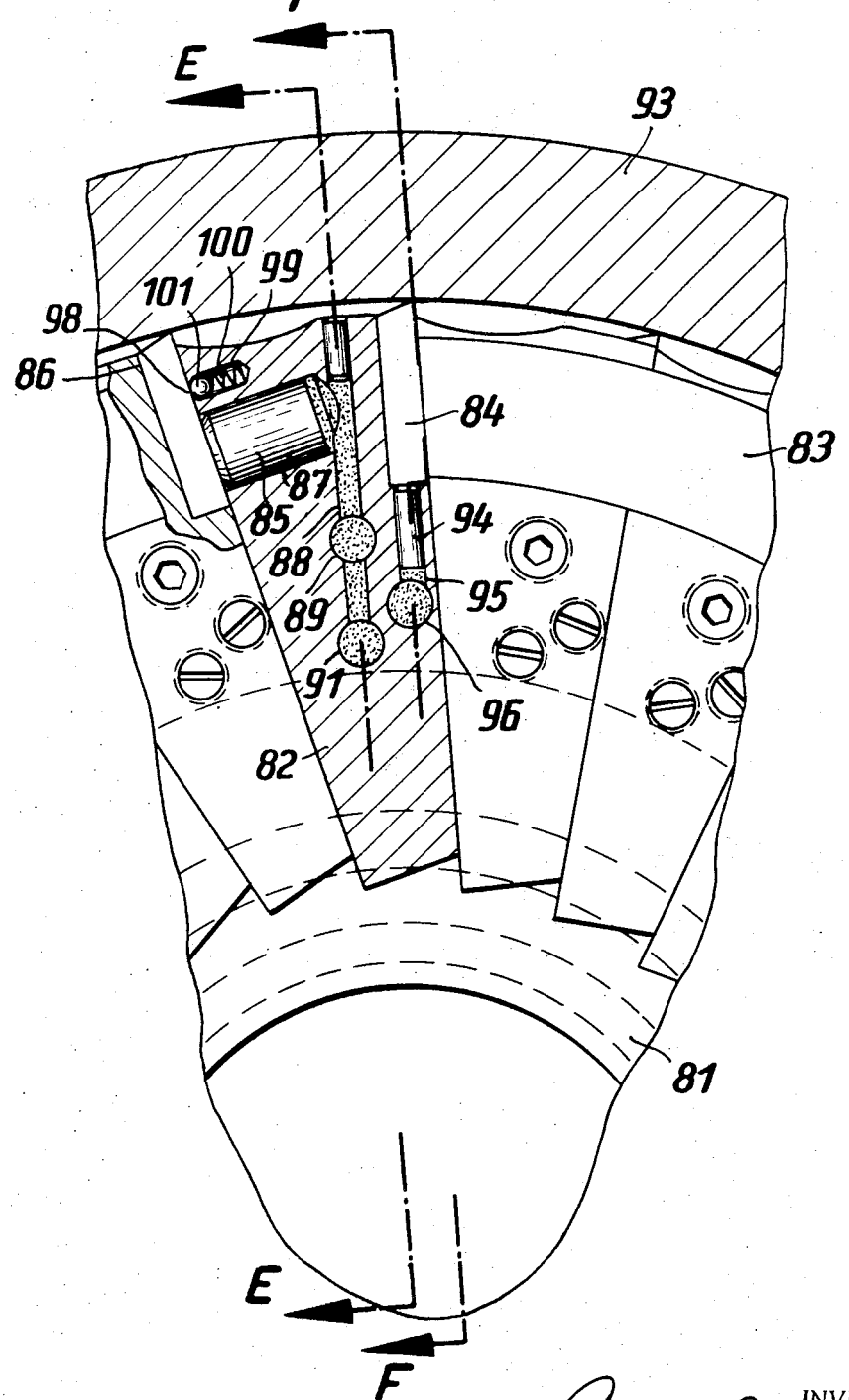
Figure 9:
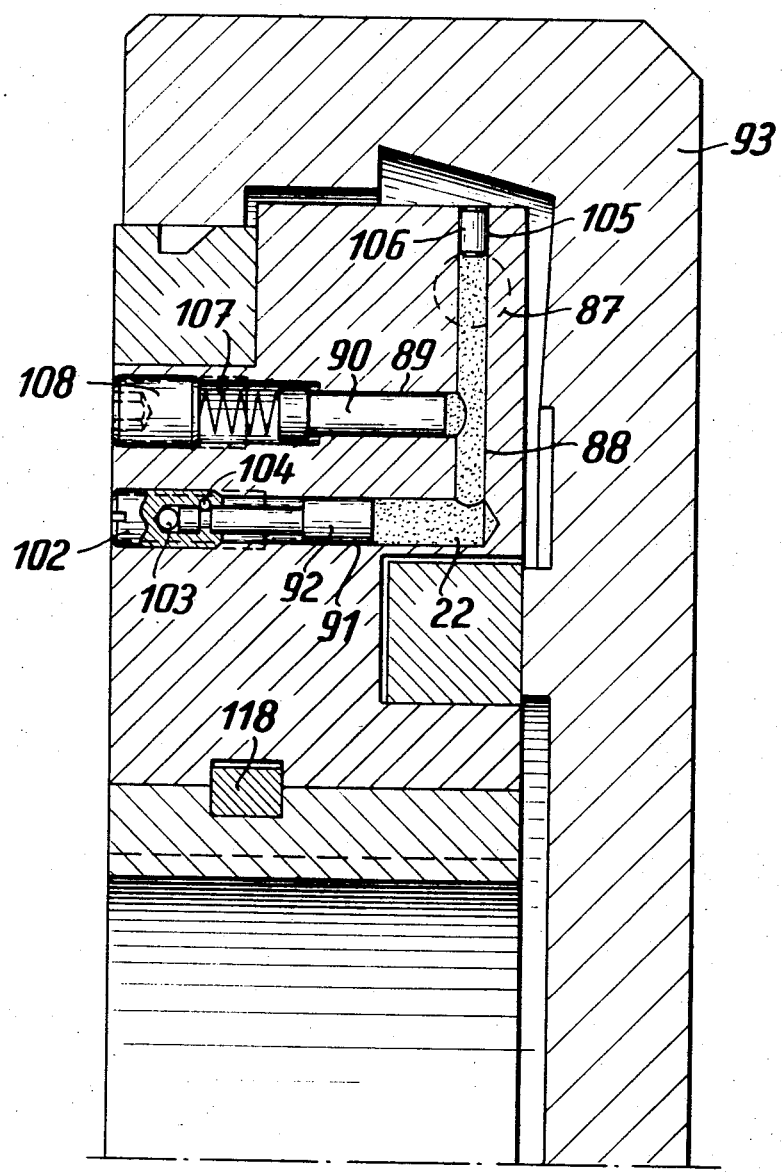
Figure 10:
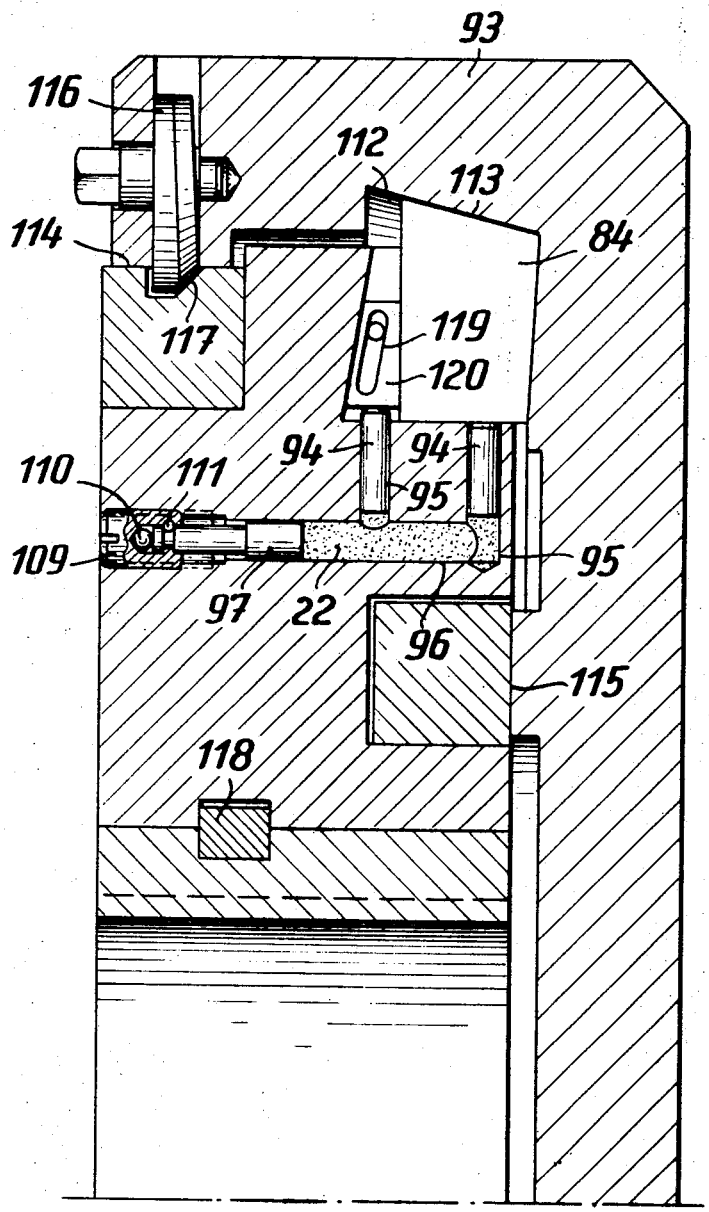
Figure 11:
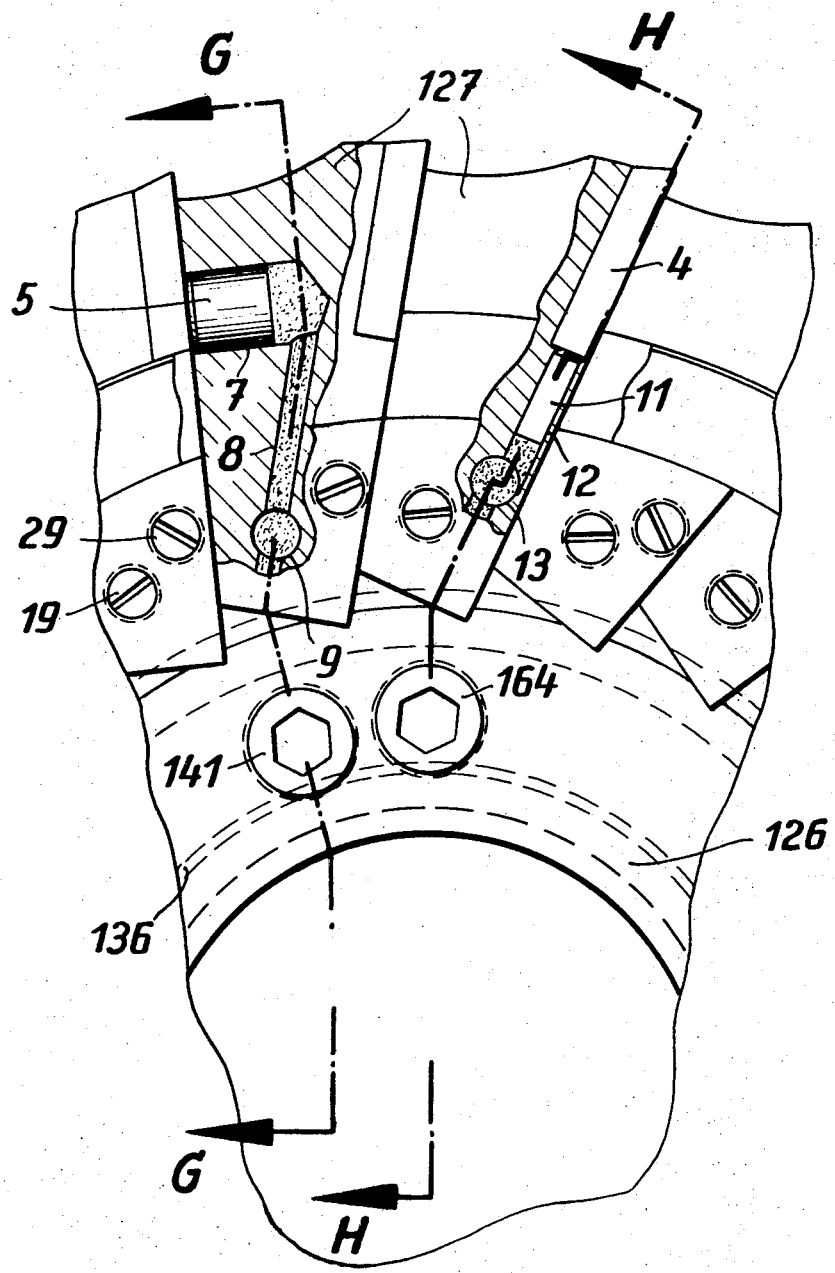
Figure 12:
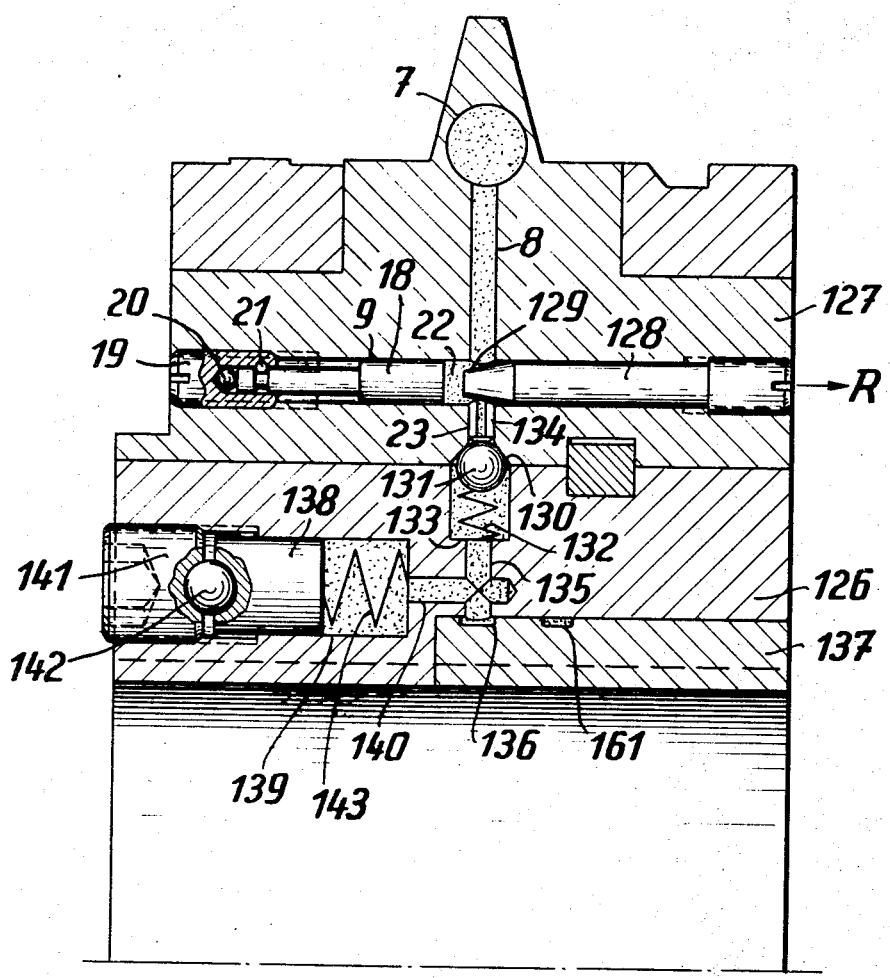

In the drawings,

FIG. 1 shows part of a sectional view of a cutter-equipped profile milling tool with centering device, FIG. 2 shows the section A—A through the tensioning system of the cutters of the profile cutter shown in FIG. 1, FIG. 3 is the sectional view B—B of the adjusting system of the cutters of the profile cutter of FIG. 1, FIG. 4 shows part of the sectional view of the bipartite centering device with the profile cutter of FIG. 1, FIG. 5 shows part of a sectional view of a hob-type milling cutter equipped with cutters and with centering device, FIG. 6 shows a sectional view of the tensioning system of the cutters of the hob-type milling cutter of FIG. 5 taken on line C—C, FIG. 7 is a sectional view of the adjusting system of the cutters and of the bipartite centering device of the hob-type milling cutter of FIG. 5, taken on line D—D, FIG. 8 is part of a sectional view on a cutter-equipped end milling tool with centering device, FIG. 9 is a sectional view of the clamping system of the cutters of the end milling tool of FIG. 8 taken along section E—E, FIG. 10 is a sectional view of the adjusting system of the cutter and of the bipartite centering device of the end milling tool of FIG. 8, taken on line F—F, FIG. 11 shows part of a sectional view of a cutter-equipped profile cutting tool with an individually and centrally controlled hydraulic adjusting and tensioning system, FIG. 12 shows a sectional view of the individually and centrally controlled tensioning system of the cutters of the profile cutting tool shown in FIG. 11, taken on line G—G, FIG. 13 shows a sectional view of the individually and centrally controlled adjusting system of the cutters of the profile cutting tool shown in FIG. 11, taken on line H—H.

In the FIGS. 1 to 4, as the first example of embodiment, a cutter-equipped tooth-shape cutting tool with centering device and with adjusting device and tensioning device is illustrated. FIG. 1 shows the body member 1, at the periphery of which segments 2 are arranged by means of rings 3 so that a disc-shaped cutter head is formed. A lateral displacement of the segments 2 on the body member 1 is prevented by the shrunk-on rings 3 and also by annular adjusting springs respectively fitting ring 38 (FIGS. 2 and 3). These segments 2 accommodate the cutter divided into head cutters and lateral cutters according to requirements, said cutters being fixedly retained in the opposite cutter accommodating recess 6. The clamping cylinder 7 is in communication with the cylinder bore 9 through the bore 8. The adjustment of a cutter 4 in the centering ring 10 is effected by the adjusting position 11, the cylindrical bore 12 of which is in communication with the bore 13 of the pressure piston 28 (FIG. 3). After the individual cutters have been placed in the recesses 6 with piston 5 relaxed, the cutters are prevented from falling out by the security means 14. This security means 14 consists of a ball 17 received in a bore 15 and subjected to the pressure of a spring 16.

From FIG. 2, the hydraulic system for tensioning the cutters may be seen. The pressure generated by the piston 18, adjustment of which is effected by the clamping screw 19 with the aid of the ball 20 for load and with the aid of a key arrangement 21 for relaxation, is transferred to the tensioning cylinder 7 and the tensioning piston 5 through the bore 8 by means of a self-sealing semi-liquid paste-like material 22 which is filled in through the opening 23. The piston 25 serving to balance the pressure of the hydraulic system is disposed on the same axis 24 of the pressure piston 18 but is effective in the opposite direction. This balancing piston 25 accommodates a spring packet 26 which is biased by the closure screw 27. FIG. 3 shows the hydraulic system for adjusting the cutters. Pressure is generated by means of the piston 28 which is transmitted by means of a self-sealing, semi-liquid, paste-like material 22 onto the adjusting piston 11 through the bore 12. Adjustment of the pressure piston 28 is effected by rotation of the tensioning screw 29. Upon generation of pressure, the force is transmitted to the pressure piston 28 via the ball 30 and upon release, the pressure piston 28 is retracted via the key arrangement 31. The adjusting piston 11 is effective on the cutter 4 which is then pressed into the inner form 32 of the centering ring 10.

FIG. 4 shows the centering arrangement. The centering ring 10 consists of two halves in order to be able to encompass the co-extensive outer contour 33 of the profile cutter by its inner configuration 32. The composed ring halves 10 are centered in a radial direction by the ring surfaces 34 and in an axial direction by the plane surfaces 35. In this centering position, the ring 10 is axially fixed in the annular groove 37 by a rotatable clamping device 36.

FIGS. 5 to 7 illustrate a second example of embodiment, namely a cutter-equipped hob-type milling tool with centering device and adjusting and tensioning system. FIG. 5 shows the construction of the hob-type milling tool which essentially consists of the body member 41, the segments 42 and the rings 43. A lateral displacement of the segments 42 on the body member 41 is prevented by the annular adjusting rings 78 (FIGS. 6 and 7) and also by the shrink-tension of the rings 43. These track-like segments 42 are fitted over the entire milling width on the periphery of the body member 41 and fastened by rings 43. The number of segments 42 corresponds to the number of cutters 44 which may be accommodated on one pitch turn of the milling helix. In these segments 42, the cutters 44 are accommodated in the recesses 45 and retained therein by the hydraulically actuated clamping pistons 46. There are as many tensioning cylinders 47 available in each segment 42 as there are pitch turns accommodated over the width of the milling cutter. The clamping cylinder 47 is in communication with the cylinder bore 49 via the bore 48. The adjustment of a cutter 44 in the centering ring 50 encompassing the milling tool is effected by the adjusting piston 51, the cylinder bore 52 of which is in communication with the bore 53 of the pressure piston 68 (FIG. 7). After the individual cutters have been placed in the recesses 45 with the piston 46 released, the cutters are prevented from falling out by security means 54. This security means 54 consists of a ball 57 accommodated in a bore 55 and subjected to the pressure of a spring 56.

FIG. 6 shows the hydraulic system for tensioning the cutters. The pressure generated by means of the piston 58 adjustment of which is effected by the clamping screw 59 with the aid of the ball 60 under load and with the aid of the key arrangement 61 with no load, is transferred through bore 48 to the tensioning cylinders 47 and to the tensioning pistons 46 (FIG. 5) by means of a self-sealing, semi-liquid paste-like material 22, which is filled in through the opening 62 and closed with screw 63. On the same axis 64 of the pressure piston 58, the piston 65 is placed which is effective, however, in the opposite direction, to balance the pressure for the hydraulic tensioning system. This balancing piston 65 accommodates a spring packet 66 which is biased by the closure screw 67.

FIG. 7 shows the hydraulic system for the adjustment of the cutters as well as the centering device. Pressure is generated by the piston 68 and is transmitted to the adjusting piston 51 by means of self-sealing semi-liquid paste-like material 22 through the bores 52. Adjustment of pressure piston 68 is effected by rotation of the clamping screw 69; upon generation of pressure the force is transmitted onto the pressure piston 68 via the ball 70 and upon relief, the pressure piston 68 is retracted by the key arrangement 71. The adjusting pistons 51 are effective on the cutters 44 which are then pressed into the inner configuration 72 of the centering ring 50. The centering ring 50 consists of two halves in order to be able to encompass the co-extensive outer contour 73 of the hob-type milling cutter by its inner configuration 72. The composed ring halves 50 are centered radially by the annular surface 74 and axially by the plane surface 75. A correctly centered position of the composed ring halves 50 related to the windings of the milling helix is guaranteed by the marking 76 at the periphery of the hob-type milling cutter being in register with the marking 77 at one side of the centering ring 50. In this centering position, the ring 50 is axially fixed by a rotatable clamping device 79 in the annular groove 80.

FIGS. 8 to 10 illustrate a third example of embodiment, namely a cutter-equipped end milling tool with centering device and with adjusting and tensioning system. FIG. 8 shows the essential construction of the cutter head for end milling, composed of the body member 81, the segments 82 and the clamping rings 83. At the periphery of the body member 81, segments 82 which are fastened by rings 83, are arranged in such a manner that a cutter head with conical cutter adjustment is formed. A lateral displacement of the segments 82 on the body member 81 is prevented by the shrink-fit of the rings 83 and also by the annular fitting ring 118 (FIGS. 9 and 10). In the interest of a possibly high feeding speed when performing end milling operations, a high number of cutters is selected and with this the number of segments 82. By these segments 82, the cutters 84 have been accommodated and are tightly retained in the cutter accommodating recess 86 opposite the cutter accommodating recess by the hydraulically actuated clamping piston 85 available in each segment. The clamping cylinder 87 is in communication with both the cylinder bore 89 of the balancing piston 90 (FIG. 9) and the cylinder bore 91 of the pressure piston 92 (FIG. 9) through the bore 88. The adjustment of a cutter 84 in the centering ring 93 encompassing the milling tool is effected by the adjusting piston 94 which is in communication with the bore 96 of the pressure piston 97 (FIG. 10) through its cylinder bore 95. After the individual cutters 84 have been placed in the accommodating recesses 86 with the piston 85 relieved, the cutters are prevented from falling out by the security means 98. This security means 98 consists of a ball 101 accommodated in a bore and subjected to the pressure of a spring 100. FIG. 9 illustrates the hydraulic system for clamping the cutters. The pressure generated with piston 92, adjustment of which is effected by means of the ball 103 under load and by the key arrangement 104 with no load, is transmitted to the tensioning piston 85 (FIG. 8) through the bore 88 to the tensioning cylinder 87 by a self-sealing, semi-liquid paste-like material 22 which is filled in through the opening 105 and closed by the screw 106. The bore 89 for the piston 90 for pressure balance of the hydraulic clamping system is arranged in parallel with the cylinder bore 91 of the pressure piston 92. This balancing piston 90 accommodates a spring packet 107 which is biased by the closure screw 108.

FIG. 10 shows the hydraulic system for the adjustment of the cutters, as well as the centering device. Pressure is generated by the piston 97 which is transmitted to the adjusting piston 94 through the bore 96 and in further distribution through the bore 95 by means of a self-sealing semi-liquid paste-like material 22. Adjustment of the pressure piston 97 takes place through rotation of the clamping screw 109. Upon the generation of pressure, the force is transferred to the pressure piston 97 via the ball 110 and upon release the pressure piston 97 is retracted by the key arrangement 111. The two adjusting pistons 94 are effective on the cutters 84 directly in a radial direction and indirectly in an axial direction via the wedge-shaped parallel member 120 guided in the groove 119 the cutters then being positively pressed into the inner configuration 112 of the centering ring 93. The centering ring 93 consists of two halves, in order to be able to encompass the coextensive outer contour 113 of the end milling by its inner configuration 112. The composed ring halves 93 are centered in a radial direction by the annular surface 114 and in an axial direction by the plane surface 115. In this centered position, the ring 93 is axially fixed by a rotatable clamping device 116 in the annular groove 117.

The advantages obtained with the invention especially consist in that, to obtain a high surface quality of the workpiece corresponding to a high accuracy of the tool as regards rotation, facing and pitch, in the various embodiments in accordance with the invention, instead of using either machine-ground cutter-equipped milling tools with high operational costs or cutter heads with cutters to be adjusted by gauges and ground outside the milling body, with lower operational costs, both reduced adjusting times which means lower operational costs than usual, and the same high surface qualities as obtained with machine-grinding are effective.

With known cutter heads, the prerequisite for obtaining the high surface quality desired for the workpiece must be newly provided for by constantly and repeatedly spending high costs in regrinding or fine-grinding the tool, while with the cutter heads designed in accordance with the invention corresponding costs, on the one hand, occur only once by erecting the inner configuration of the centering ring which constantly is to provide the prerequisite for the desired high surface qualtiy, and, on the other hand, with the cutter heads formed in accordance with the invention, the constantly occurring costs for re-grinding the cutters removed from the milling body advantageously are at so low a level because it is possible to perform this re-grinding operation on simple grinding machines usable for general grinding operations.

Because of these advantages, an essential technical progress is obtained over today's prior art by the milling tools designed in accordance with the invention.

FIGS. 11 to 13 illustrate an example of embodiment in connection with a profile milling tool as shown in its principal traits as the example of embodiment in FIGS. 1 to 4, and modified in accordance with the further development of the invention. FIGS. 11 to 13 show the individual and central hydraulic control systems for clamping and adjusting the cutters. As a hydraulic fluid, here as well, either a self-sealing semi-liquid paste-like material or a conventional hydraulic oil 22 is employed. In the interest of simplification of the representation on equally sized sheets, the position of the section line G—G shown in FIG. 11 has been replaced with respect to the position of the section line H—H.

The FIGS. 11 and 12 show the individually and centrally controlled hydraulic system for tensioning the cutters 4. A piston 18 is arranged in each segment 127 for individual pressure generation. Adjustment of the piston 18, for pressure generation, is effected by rotation of the clamping screw and axial movement conditioned thereby via the ball 20 and, for release, is effected by counter rotation of the clamping screw 19 as well as via the key arrangement 21. In the bore 9 opposite the pressure piston 18 there is disposed the threaded spindle 128 with cone 129 initiating the cutoff function. At the transition of the bore 8 in the segment 127 into the base member 126 there is situated the valve seat 130 with valve ball 131, spring 132, spring seat 133 and transmitting pin 134. Furthermore, the bore 135 in the base member 126 leads as far as to the annular groove 136 which is situated in the inserted ring 137 and which establishes communication between the hydraulic system for individually tensioning the cutters 4 and the central hydraulic system for simultaneously tensioning all the cutters 4. In the base member 126, there is disposed in the cylinder bore 139 a piston 138 for centrally generating the tensioning pressure. This cylinder bore 139 is in communication with the annular groove 136 through bore 140 via bore 135. The centrally generated pressure of the piston 138, adjustment of which for pressure generation is effected by rotating the tensioning screw 141 as well as axial movement conditioned by said rotation via the ball 142 and for release is effected by counter-rotation of the clamping screw 141 as well as via the spring 143, is transmitted through the bores 135 and 140 in the base member 126, distributed through the annular groove 136 to all the segments 127 and passed onto the cylinders 7 each through a valve 130 opened by the spindle 128 and to the tensioning pistons 5 and thus simultaneously to all the cutters 4. If only the valve 130 of one segment 127 is closed by the rotary or axial movement of the spindle 128 in the direction of the arrow R and the release of pressure of the spring 132 conditioned thereby onto the valve ball 131 by means of the cone 129, so that part of the hydraulic system which is situated within this segment 127 will have become an individually controlled tensioning system for the respective one cutter. This respective one cutter 4 may be replaced by pressure release via piston 18 in the manner as described above, while all the other cutters 4 remain tensioned by the centrally controlled pistons 5. The one cutter 4 is re-tensioned via the individual pressure piston 18 and by subsequently opening of the valve 130, whereby the individual control is again connected to the center control.

FIGS. 11 and 13 show the individually and centrally controlled hydraulic system for the adjustment of the cutters 4. A piston 28 for individual pressure generation is arranged in each segment 127. Adjustment of the piston 28 as arranged takes place through rotation of the clamping screw 29 and axial movement conditioned thereby via the ball 30 and by counter rotation of the clamping screw 29 as well as the key arrangement 31 for release. The lead screw 151 with cone 152 initiating the cutoff function is situated in the bore 12 into the base member 126 in the segment 127 there is disposed the valve seat 153 with valve ball 154, spring 155, spring seat 156 and transition pin 157. The bore 158 in the base member 126 furthermore leads via the bores 159 and 160 as far as the annular groove 161 which is disposed in the fitted ring 137 and establishes the communication between the hydraulic systems for the individual adjustment of the cutters 4 of the individual segments 127 and the central hydraulic system of the base member 126 for simultaneously adjusting all the cutters 4. In the base member 126, a piston 162 is provided in the cylinder bore 163 for central generation of the adjusting pressure, said cylinder bore 163 in turn communicating with the annular groove 161 through the bores 159 and 160. The centrally generated pressure of the piston 162, adjustment of which for pressure generation is effected by rotation of the clamping screw 164 as well as via the spring 166 for release, is transmitted through the bores 158, 159 and 160 in the base member 126, distributed through the annular groove 161 to all the segments, passed on through respective valves 153 opened by a spindle 151, into the cylinder bores 12 onto the individual piston 11 and thus simultaneously to all the cutters 4. If, with pressurized central hydraulic systems, the valve 153 of a segment 127 is closed by rotary or axial movement of the spindle 151 in the direction of the arrow R and release of pressure of the spring 155 conditioned thereby onto the valve ball 154 by means of the cone 152 and the transmitting pin 157, so that part of the hydraulic system which is situated within this segment 127 will have become an individually controlled adjusting system for the respective one cutter 4. After pressure release via the adjusting piston 28 in the manner as described above, the one cutter 4 may be inserted and brought into the position fixed by the centering ring 10 by generation of pressure via the adjusting piston 28 (FIG. 3), while the adjustment of the remaining cutters 4 is not influenced thereby. Upon completion of the adjusting step and fastening of the cutters 4 by the corresponding clamping operation, the individual control is again connected to the central control of the adjusting system by opening the valve 153.

The various hydraulic control systems described above may be employed in this manner or in various further combinations in a universal manner also in all the other cutter-equipped milling tools designed in accordance with the invention.

The advantages obtained with the further developed invention essentially lie in that by the combination of all the adjusting and tensioning elements, respectively, into central hydraulic control systems via the communication lines for simultaneously adjusting and tensioning the cutters, equal pressures will positively exist in the control systems. In this condition, a uniform contact pressure of the cutting edges of the cutters against the inner surface of the centering ring is guaranteed, which is connected with highest safety in achieving and maintaining the high-grade quality of the cutting tool thus precluding damage to the centering surface and negative effects on the optimum life of the centering ring. Another advantage of the central hydraulic control system, in accordance with the invention, lies in the reduced adjusting times, inversely proportional to the number of holders, and, with this, the lowering of tool costs.

Another advantage which is obtained by the further development of the invention, resides in that all the requirements of employment occurring in practical operation may be met in a most favourable way as regards costs and time, by the universal hydraulic control system for adjusting and tensioning the cutters which, due to the combination of systems includes all the advantages of the individual control and the central control.

What I claim is:

1. A system for manufacturing and assembling a milling tool comprising, in combination, a rotatably drivable base member having an axis of rotation, radially disposed sides and a circumference, a plurality of substantially radially extending cutter receiving recesses defined in said base member intersecting said circumference, a cutter within each of said recesses, a plurality of hydraulically operated adjustment pistons mounted in said base member radially oriented to said axis, a piston intersecting each cutter receiving recess for engaging and radially adjusting the associated cutter, an annular axially extending centering ring first orientation surface defined on said base member adjacent said circumference thereof and concentric to said axis of rotation, a centering ring having an inner circumferential contour of a cross section corresponding to the configuration of said cutters removably encompassing said cutters and including an annular second axially extending orientation surface adapted to engage said first surface to concentrically mount said ring on said base member, said ring circumferential contour limiting and determining radial adjustment of said cutters, a plurality of hydraulically operated clamping pistons mounted on said base member each intersecting a cutter receiving recess and each transversely related to the adjustment piston intersecting the common recess, and hydraulic fluid pressure producing means mounted on said base member communicating with said adjustment and clamping pistons to selectively impose hydraulic pressures on said pistons.

2. In a system for manufacturing and assembling a milling tool as in claim 1, wherein said fluid pressure producing means includes a first screw operated piston communicating with each of said adjustment pistons and a second screw operated piston communicating with each of said clamping pistons.

3. In a system for manufacturing and assembling a milling tool as in claim 2 wherein the screws operating said pressure producing means intersect a radially disposed side of said base member.

4. In a system for manufacturing and assembling a milling tool as in claim 1, a plurality of spring biased accumulators defined in said base member, an accumulator communicating with each clamping piston to maintain a predetermined pressure upon the associated clamping piston.

5. In a system for manufacturing and assembling a milling tool as in claim 1, friction producing means interposed between said recesses and the associated cutter maintaining said cutters within its recess prior to clamping of said cutters by said clamping pistons.

6. In a system for manufacturing and assembling a milling tool as in claim 1 wherein said centering ring is formed of at least two parts for removal from said base member, first and second radially extending orientation surfaces defined on said base member and centering ring, respectively, adapted to engage to axially orient said base member and ring, and adjustment means interposed between said base member and ring for relatively axially displacing said base member and ring for adjustment.

7. In a system for manufacturing and assembling a milling tool as in claim 1, a first passage defined in said base member establishing communication between all of said clamping pistons whereby said clamping pistons may be simultaneously pressurized.

8. In a system for manufacturing and assembling a milling tool as in claim 7, a plurality of valve members defined in said base member and each associated with a clamping piston and interposed between the associated clamping piston and said first passage to permit selective pressurization of said clamping pistons.

9. In a system for manufacturing and assembling a milling tool as in claim 1, a second passage defined in said base member establishing communication between all of said adjustment pistons whereby simultaneous radial adjustment of all of said cutters may be produced.

10. In a system for manufacturing and assembling a milling tool as in claim 9, a plurality of valve members defined in said base member and each associated with an adjustment piston and interposed between the associated adjustment piston and said second passage to permit selective pressurization of said adjustment pistons.

11. A system as claimed in claim 1 having in combination, a plurality of segmental pieces arranged around said base member in direct contact one against another along substantially radial border surfaces, two rings encompassing and shrunk upon said plurality of segmental pieces for fastening said pieces to said base member, a substantially radially extending cutter receiving recess defined along one of said radial border surfaces of each of said pieces and being limited and defined by a substantially radial border surface of the adjacent segmental piece.

References Cited

UNITED STATES PATENTS 3,298,107   1/1967   Bergstrom _____ 33—189

FOREIGN PATENTS 1,124,730   8/1968   Great Britain _____ 29—105
955,243   6/1949   France.
318,815   2/1920   Germany _____ 29—105

HARRISON L. HINSON, Primary Examiner

U.S. Cl. X.R.

29—105; 33—185